June 30, 1959 E. M. KEEN ET AL 2,892,447
MULTIPLE NEST STRUCTURE FOR POULTRY
Filed June 5, 1956 3 Sheets-Sheet 1
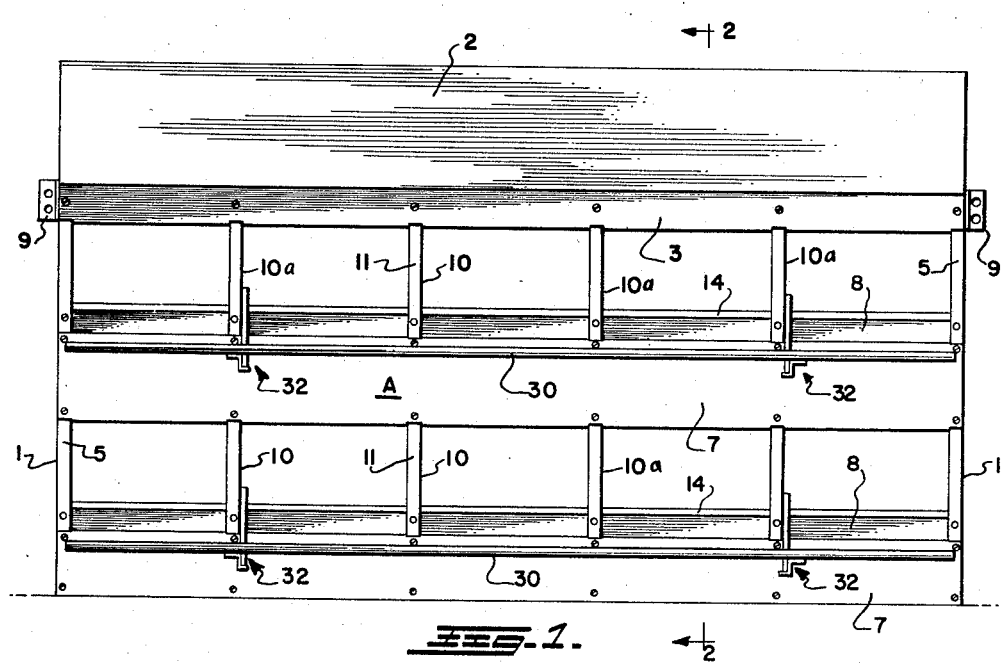
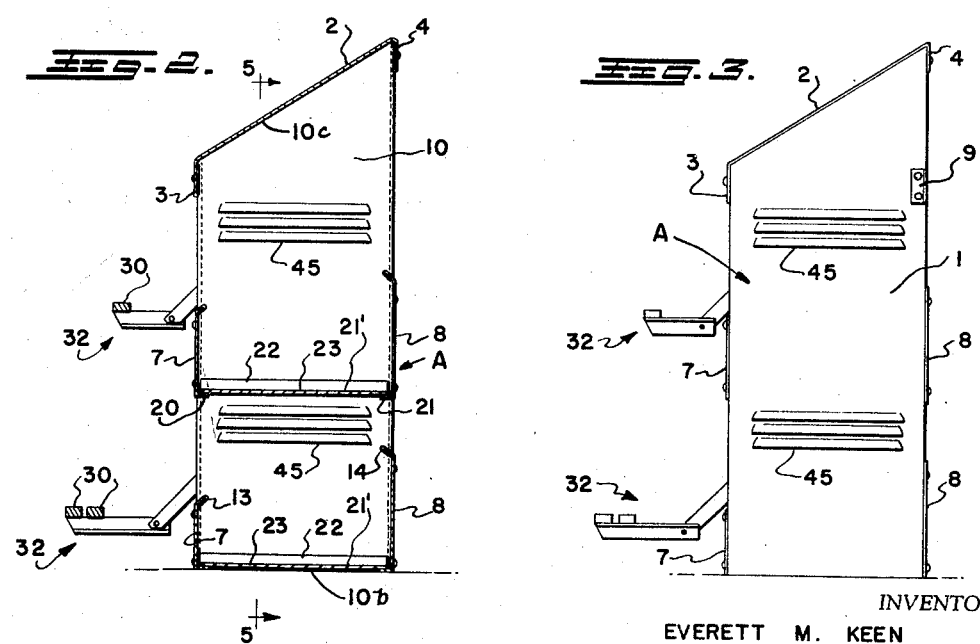
INVENTORS
EVERETT M. KEEN
ANTHONY J. SICILIANO
BY
ATTORNEY

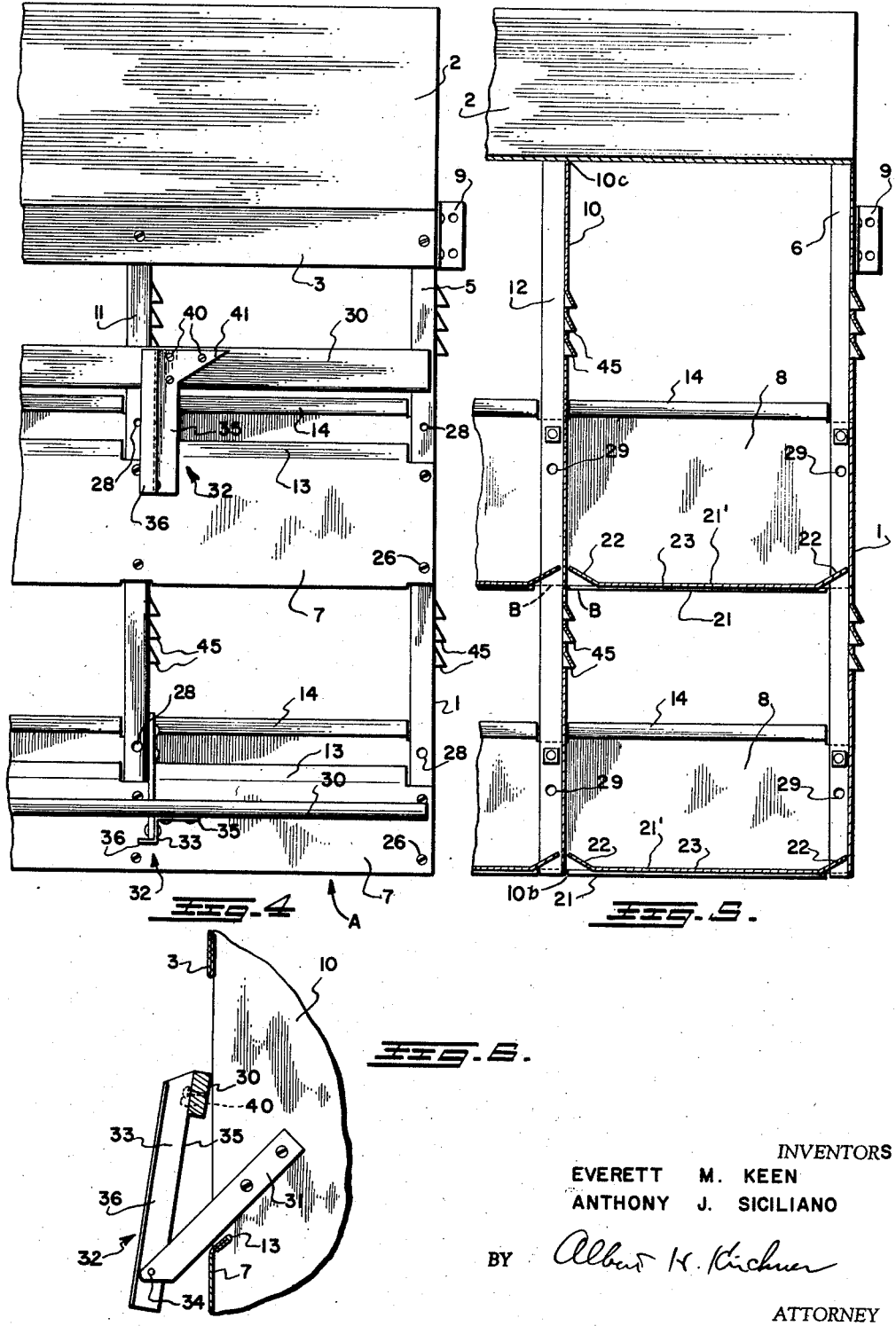

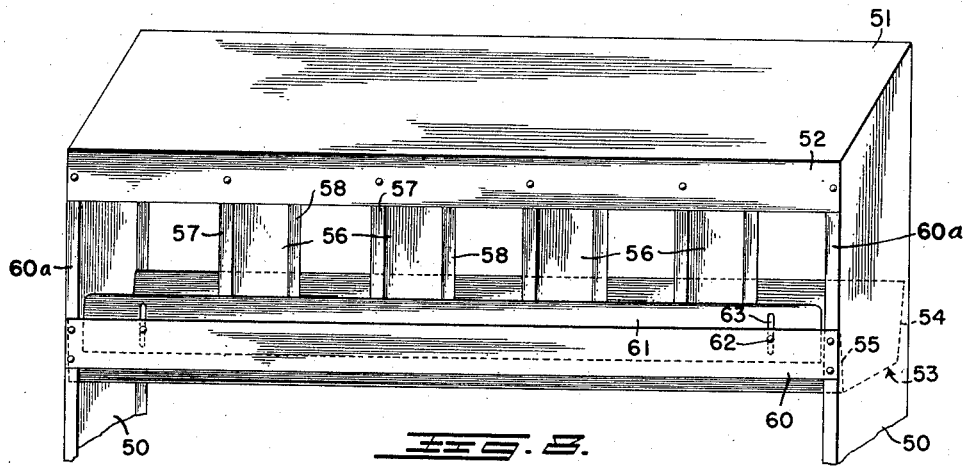
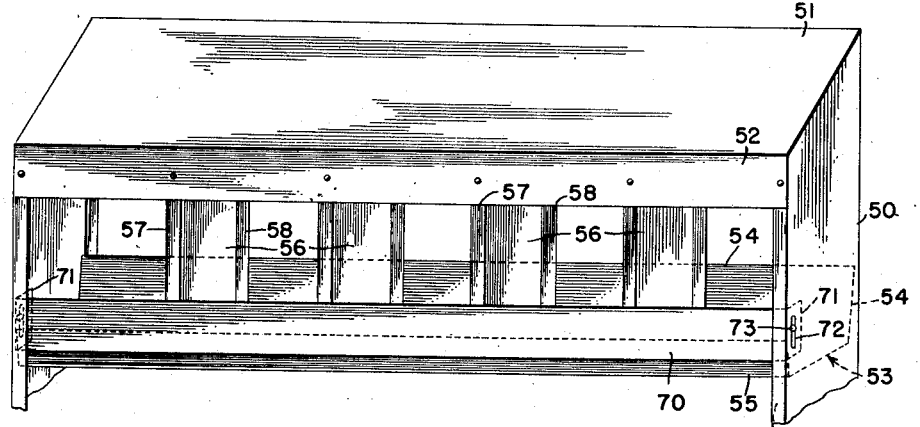
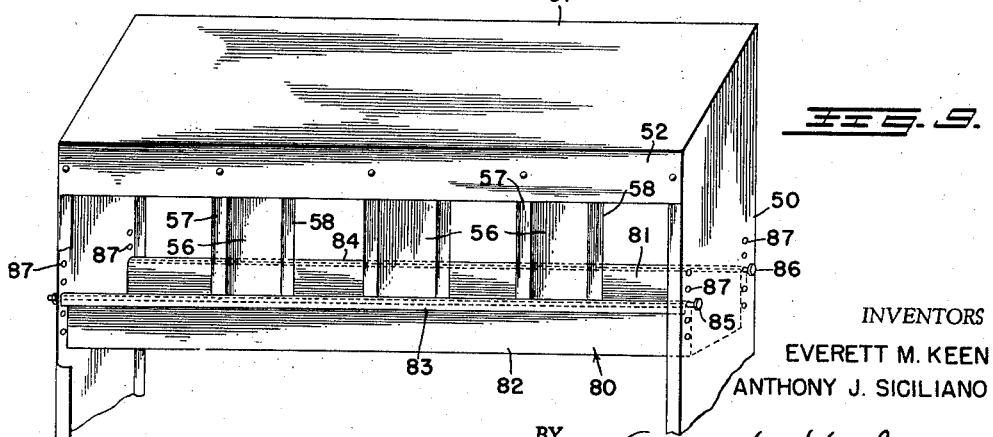

United States Patent Office 2,892,447
Patented June 30, 1959

2,892,447

MULTIPLE NEST STRUCTURE FOR POULTRY

Everett M. Keen and Anthony J. Siciliano, Vineland, N.J., assignors to Keen Manufacturing Corporation, Vineland, N.J., a corporation of New Jersey Application June 5, 1956, Serial No. 589,497

6 Claims. (Cl. 119—45)

The present invention relates to poultry equipment, and more particularly to a multiple nest structure.

A principal object of the invention is to provide a multiple nest structure capable of being economically manufactured principally of durable sheet metal parts and which can be distributed economically in knockdown form for easy and ready assembly by the purchaser.

A further principal object is to provide a multiple nest structure in which the openings providing access to and from the individual nests are adjustable so that the structure can be set up with large openings to accommodate large birds or with smaller openings better suited to smaller birds.

A related object is concerned with providing a multiple nest structure of the type indicated in which front and rear walls are interchangeable to accommodate poultry of different size and weight; and other more specific objects are to provide a set-up assembly from which the nest compartment floors are readily removable for cleaning, and to provide a generally improved multiple nest construction.

Certain preferred forms of embodiment of the invention are depicted in the accompanying drawings, in which Figure 1 is a front elevational view of one form of construction showing a complete multiple nest structure with folding perches in lowered position;

Fig. 2 is a vertical cross sectional view taken on the line 2—2 of Fig. 1;

Fig. 3 is an end elevational view;

Fig. 4 is a front elevational view on a relatively enlarged scale of one end portion of the structure, showing the perch bar of the upper story in closed position and the perch bar of the lower story in open position;

Fig. 5 is a vertical longitudinal sectional view on the same scale as Fig. 4, taken on the line 5—5 of Fig. 2;

Fig. 6 is a detail elevational view showing one of the partitions and the attached perch bracket;

Fig. 7 is a perspective view of a modified form of multiple nest structure with the perch bar and its appurtenances omitted;

Fig. 8 is a similar view of a further modified type of multiple nest structure; and Fig. 9 is a similar view of a still further modified type of multiple nest structure.

Referring to these figures, and first to Figs. 1–6, the nest structure comprises a pair of spaced identical end walls 1, 1, each having a forwardly sloping top edge for fitting a pitched roof 2 provided with a downturned front flange 3 and a downturned rear flange 4 which are bolted respectively to an inwardly directed front flange 5 and an inwardly directed rear flange 6 of each end wall.

The outer wall structure, designated generally A, is completed to form a rigid assembly by a front wall 7 and a rear wall 8, one of each for each story of the structure, each of the same length as the roof, and each bolted at its end margins to the flanges 5 and 6 of the end walls.

All of the wall and roof parts thus far described are best formed of galvanized sheet iron of suitable gauge to provide an adequately rigid, self-supporting structure which can be mounted on the ground or a floor or can be bolted or otherwise secured to the wall of a building, as by angular brackets 9 shown in Fig. 1, bolted to the end walls 1 and to the building wall, or by other means.

The nest structure may comprise a single story, having only one front wall and one rear wall as shown in the embodiment of the invention illustrated in Figs. 7, 8 and 9, or it may comprise two stories, as shown in the embodiment illustrated in Figs. 1–5, or even more, as will be understood. In the two-story construction two front walls 7 and two front walls 8 are used, and a corresponding additional number of front and rear walls will be employed to provide additional stories, with corresponding increase in the height of the end walls 1.

Lengthwise the multiple nest structure is divided transversely into a plurality of individual nest compartments by partitions 10, each made of sheet metal of the kind used for the walls and roof, and each consisting of a plate 10a having a squared bottom edge 10b and a forwardly and downwardly inclined top edge 10c, thus corresponding to the shape of the end walls. Each partition has a right angularly bent front flange 11 and rear flange 12 to which each front wall 7 and each rear wall 8, respectively, is bolted.

The upper edge of each front wall and each rear wall is best bent slightly inwardly to provide the obtuse angled flanges shown at 13 for the front wall and 14 for the rear wall, and these flanges are preferably trimmed at their free edges by reversely bending the metal on itself to provide a smooth rounded edge, in accordance with conventional sheet metal fabricating practice.

The same trimming expedient is employed for all the other wall and roof flanges of the structure.

The front and rear walls are provided also with inwardly directed bottom edge flanges 20 and 21, respectively, which are cut out to accommodate the edge flanges 11 and 12 of the partitions 10 and the edge flanges 5 and 6 of the end walls 1. These flanges 20 perform the function of supporting floor plates 21', each of which comprises a single plate of sheet metal, unflanged at its edges, generally rectangular in shape but provided with side edge margins 22 which are bent slightly upwardly from a flat central area 23, and having cut-out corners as shown at B for accommodating the bolts or nuts 26 which secure the front and rear walls to the end walls and/or partitions.

It will be recognized that this construction permits each of the floor plates to be inserted into a compartment defined by the front and rear wall and a pair of partitions, or a partition and an end wall, and then to be lowered into position to rest on the front and rear wall flanges 20, 21. It will also be evident that in this position the inclined side edges 22 of the floor plates make good contact with the partitions or a partition and an end wall and that the plates can be removed readily by pushing them up from the bottom, so that they are easily cleaned and replaced.

The front and rear walls 7 and 8 are best made of different height, as shown in Fig. 2, and they are made interchangeable so that the relationship shown in Fig. 2, with the front wall lower than the rear wall, can be reversed. Extra bolt holes 28 in the partition front flanges 11 and in the end wall front flanges 5, shown unused in Fig. 4 because low walls are there installed as the front walls, and extra bolt holes 29 in the partition rear flanges 12 and in the end wall rear flanges 6, shown unused in Fig. 5 because high walls are there installed as the rear walls, are provided to accommodate a reversal of the arrangement of low front walls and high rear walls shown in the illustrated embodiment. It will be understood that the complete collection of parts for a single structure, as packaged in knock-down form, comprises only one front wall and only one rear wall for each story, i.e., two front walls and two rear walls for the two-story structure shown in the drawings. The assembly is made by the purchaser to suit his requirements.

As shown in Fig. 2, with the lower member used as the front wall, the compartments are suited for large, heavy fowl, such as barred rocks and the like. With the arrangement reversed, i.e., with the higher wall 8 used as the front and the lower wall 7 relegated to the rear, the compartments are suited for accommodating lighter, smaller fowl, such as white leghorns. By this feature of the invention, the knockdown kit can be assembled by the purchaser to suit the size and weight of the birds with which he will use the assembly, and at any time the set-up relationship can be changed, as has been explained. Thus the purchaser is spared the expense of buying extra parts for adjusting the sizes of the openings to the nest compartments.

It will be understood that the height of the rear wall is unimportant because the construction is in practice stood against the wall of a building or some other surface that closes the backs of the compartments.

The perch of the construction comprises a longitudinal perch bar 30, or a pair of such bars 30, 30, as shown in the upper story and the lower story, respectively, in the illustrated embodiment of the invention. Each bar or pair of bars extends longitudinally along the front of the series of nest compartments and is mounted for movement between the extended operative position shown in Figs. 1, 2 and 3 and in the lower portion of Fig. 4, and a folded or closed position, as shown in Fig. 6 and the upper portion of Fig. 4, in which access to the nest compartments is prevented.

The mounting of the perch bars is effected by means of hinged bracket arrangements each comprising a bracket 31 bolted to one of the partitions and extending angularly downwardly therefrom, projecting out beyond the front edge thereof, as best shown in Fig. 6, and having an arm 32 pivoted at its rear to the forward end of the bracket and supporting the perch bar or bars 30 at its forward end portion.

The brackets 31 are best made of strap iron, and the arms 32 are conveniently made of sheet metal of somewhat heavier gauge than that used for the walls, roof and partitions. This sheet metal is bent into generally Z-shape in cross section, to provide a vertical web 33 which is pivoted at 34 to the bracket 31, and oppositely directed upper and lower flanges 35 and 36, respectively, which stiffen the arm. The upper flange 35 seats the perch bar 30, and the lower flange 36 serves as an abutment for engaging the lower edge of the bracket 31 and limiting downward movement of the arm 32 to horizontal position as shown in Fig. 2.

It is of course this downwardly disposed position which is the operative position of the perches, in which they are normally set to assist the birds in entering and leaving the nest compartments. When it is desired to close the compartments, the perch bars are swung up to the Fig. 6 position, in which they effectively prevent movement of the birds into or out of the compartments.

The perch bars 30 are best made of wood, and they are secured to the arms 32 by means of bolts 40 passing through the bars and through the upper horizontal flanges 35 of the arms 32. To provide very stout, permanent and indestructible connection between the bars and the arms, the upper flanges 35 are widened, as shown at 41 in Fig. 4. This provides expanded bearing surface and permits an increased number of bolts to be used.

It will be noted that the connection of each bar to its arm 32 is made by bolts standing right angularly through the bar stock, and not longitudinally through an end thereof, as has been customary in the prior art. Because the wooden bars are thus drilled transversely of their grain to receive the bolts, and because the holes are not drilled close to the ends of the bars, the new construction completely eliminates the tendency of the previous constructions to split the wood, with resulting destruction of the perch bars and the necessity of replacing them.

The new arrangement contemplates also providing perch bar supporting arms and brackets inwardly from the ends of the bars, with connection of the brackets to partitions rather than to end walls as was customary in the prior art. The new arrangement permits a relatively long bar thus to be supported without sagging by the use of only two brackets, as shown in Fig. 1. Two brackets have been found adequate on embodiments of the invention up to seven feet in length. For structures eight feet long or longer it is desirable to use three equally spaced brackets. However, in all cases the endmost brackets are secured to partitions rather than to end walls, and portions of the perch bars extend beyond the endmost brackets. The arrangement provides good support for the bars, without sagging, and completely eliminates tendency of the wood to split at the connections to the perch supporting arms.

The end walls and the partitions may be louvered as shown at 45 for ventilation if desired.

Figs. 7, 8 and 9 show modifications of the multiple nest structure providing different means for altering the size of the front openings by which the birds enter the nests. The perch and its brackets have been omitted from these figures in order more clearly to show the opening-adjusting arrangements, but it will be understood that the perch and its brackets are just as well suited to use on these modified structures as on the first described form of Figs. 1–6, and in actual use the perch is bracketed to the partition walls of the modified structures that will now be described.

In Fig. 7, a pair of end walls 50 are surmounted by a roof 51 having a downturned front flange 52, all formed and connected as explained in the disclosure of the previously described construction. A generally trough-shaped floor member 53 is fixed to the end walls and has an upturned back portion forming a fixed rear wall 54 and a similar, but lower, upturned front portion forming a portion 55 of the front wall. Vertical partitions 56 at spaced intervals divide the next compartments and are fixed to the front and rear of the structure as by having their marginal flanges 57 and 58 respectively bolted to the upper front flange 52 and the back portion 54 of the trough-shaped floor member 53.

The front of the structure is trimmed by a lower front wall 60, which is quite narrow, i.e., low, and is bolted at its ends to front flanges 60a formed on the end walls 50. To adjust the nest access openings to suit smaller birds than the very large ones that would be accommodated by the use only of the low front wall 60, a supplemental plate closure 61 is provided, and this member is made adjustable up and down on the low front wall 60 by pin and slot connections such as the bolt 62 in the low front wall 60 which stands in the slot 63 formed in the supplemental member 61, as shown at each end of the structure. Thus it is a simple matter to raise or lower the member 61 and fix it at any desired height within a range of adjustment designed to accommodate the largest or smallest birds.

The arrangement shown in Fig. 8 is generally similar to that of Fig. 7, as indicated by the use of the same reference numerals for the identical parts. Here, however, the front supplemental closure plate 70 has back-turned end flanges 71 which are adjustable up and down by pin and slot connections with the end walls 50. As shown in the illustrated form of this type of structure, each end wall 50 has a vertical slot 72 into which a bolt 73 extends from the adjacent flange 71. Tightening this bolt, or the nut thereon, clamps the plate 70 high or low on the front wall portion 55 to vary the size of the nest access opening, as will be understood.

Fig. 9 shows a further modification in which the trough-shaped bottom 80, which has a back wall 81 and a front wall 82, is adjustable bodily up and down in a range limited by the bottoms of the partitions 56 to vary the size of the openings to the nests. For this purpose each of the front and back walls of the trough is flanged as shown at 83, 84, respectively, so as to hook over long front and back rods 85, 86, respectively, which stand through holes 87 formed in series in the end walls 50. With a head on one end of each rod and a nut threaded on the other end, it is necessary only to set the rods in selected holes and turn up the nuts in order to position the troughs, and hence the front walls thereof, at any selected height in the structure, thus varying the access openings as desired.

As has been stated hereinabove, the modified multiple nest structures of Figs. 7, 8 and 9 are to be used with the folding perch arrangement shown in Figs. 1–6 in order to attain the full benefits of the present invention. In this way the nests are not only fixed in adjustment to suit the particular sizes of birds that are to be accommodated, but the birds may be excluded from the nests when desired.

It may be explained here that it is important to use nest access openings of small size for small birds, such as leghorns, and to enlarge the openings only when required for larger birds, such as the various species of rocks, because it is believed that the smaller birds, which tend to be nervous and high strung, are more quiet and comfortable when nesting behind a relatively high enclosure which gives them greater seclusion and a sense of being better protected. Moreover, the relatively high front walls, i.e., walls made as high as possible consistent with admitting the bird by which the nest is intended to be used, tend to exclude other birds and thus reduce fighting and cannibalism. It will be appreciated that these are considerations which appear to support the supposed preference of leghorns and other relatively small birds for nests having small openings.

It is to be understood that the invention is capable of being embodied in other and further modified forms, departing in detail from the structure of the preferred embodiments which are shown and described in this application for Letters Patent, but all such modifications, to the extent that they embody the principles of the invention as defined by the broader of the appended claims, are to be deemed to be within the scope and purview thereof.

We claim:

1. A multiple nest structure for poultry of different sizes and weights comprising a housing having a pair of spaced end walls, means connecting said end walls comprising a roof connecting the upper ends of the end walls and front and back walls connecting the lower portions of the end walls at their front and rear respectively, said front and back walls both being lower than the end walls and each being of different height from the other and being interchangeably attachable to the end walls, and partitions dividing the space between the end walls into a plurality of nest compartments.

2. A multiple nest structure for poultry of different sizes and weights comprising a housing having a pair of spaced end walls, a roof connecting the upper ends of the end walls, means connecting the lower portions of the end walls comprising front and back walls each having its lower edge formed with an inwardly directed flange, partitions dividing the space between the end walls into a plurality of nest compartments, and a plurality of floor plates each having its front and rear edge margins supported in bearing relation on the front and bask wall flanges of one of the compartments, the front and back walls being of different heights and being interchangeably attachable to the end walls and partitions for adapting the nest compartments for poultry of different sizes and weights.

3. A multiple nest structure for poultry of different sizes and weights comprising a housing having a pair of spaced end walls, means connecting said end walls comprising a roof connecting the upper ends of the end walls and front and back wall means connecting the lower portions of the end walls at their front and rear respectively, and partitions dividing the space between the end walls into a plurality of nest compartments, said front and back wall means being lower than the end walls and comprising front and back wall elements of different height operatively connected to the end walls and adjustably movable relatively to said end walls so as to provide a plurality of nest compartment access openings at the front of the housing of uniform height selectively adjustable relative to the height of the openings at the back of the housing.

4. A multiple nest structure as claimed in claim 3 in which the front wall element of the front and back wall means includes a lower wall portion directly connected to the end walls and an upper wall portion vertically adjustably connected to the lower wall portion.

5. A multiple nest structure as claimed in claim 3 in which the front wall element of the front and back wall means includes a lower wall portion directly connected to the end walls and an upper wall portion vertically adjustably connected to the end walls.

6. A multiple nest structure as claimed in claim 3 in which the front and back wall means comprises a unitary trough shaped structure having upright wall elements of different height connected by an intervening horizontal area forming the floors of the compartments, in combination with means adjustably connecting the ends of the upright wall elements to the end walls for selectively positioning said wall elements alternatively at the front or the back of the housing.

References Cited in the file of this patent

UNITED STATES PATENTS

| | | |
|---|---|---|
| 1,519,518 | Thorp et al. | Dec. 16, 1924 |
| 1,610,220 | Olson | Dec. 7, 1926 |
| 2,059,400 | Russell | Nov. 3, 1936 |
| 2,494,709 | Keagle | Jan. 17, 1950 |
| 2,591,021 | Smith | Apr. 1, 1952 |
| 2,633,826 | Hansen | Apr. 7, 1953 |
| 2,658,475 | Hobbs | Nov. 10, 1953 |
| 2,728,324 | Radocy | Dec. 27, 1955 |
| 2,733,427 | Chandler | Jan. 31, 1956 |
| 2,833,246 | Weber | May 6, 1958 |